Nov. 26, 1957 L. V. ANDERSON 2,814,343

STRIP SPLICER

Filed Dec. 22, 1950 12 Sheets-Sheet 1

INVENTOR.
LYSLE V. ANDERSON
BY Richey & Watts
ATTORNEYS

Nov. 26, 1957 L. V. ANDERSON 2,814,343

STRIP SPLICER

Filed Dec. 22, 1950 12 Sheets-Sheet 2

INVENTOR.
LYSLE V. ANDERSON

BY Richey & Watts

ATTORNEYS

SHEAR POSITION

INVENTOR.
LYSLE V. ANDERSON
BY Richey & Watts
ATTORNEYS

Nov. 26, 1957 L. V. ANDERSON 2,814,343

STRIP SPLICER

Filed Dec. 22, 1950 12 Sheets-Sheet 4

INVENTOR.
LYSLE V. ANDERSON

BY Richey & Watts

ATTORNEYS

STRIP SPLICER

Filed Dec. 22, 1950 12 Sheets-Sheet 5

INVENTOR.
LYSLE V. ANDERSON
BY Richey & Watts
ATTORNEYS

Nov. 26, 1957 L. V. ANDERSON 2,814,343

STRIP SPLICER

Filed Dec. 22, 1950 12 Sheets-Sheet 6

INVENTOR.
LYSLE V. ANDERSON

BY Richey & Watts

ATTORNEYS

Nov. 26, 1957 L. V. ANDERSON 2,814,343

STRIP SPLICER

Filed Dec. 22, 1950 12 Sheets-Sheet 7

INVENTOR.
LYSLE V. ANDERSON

BY Richey & Watts

ATTORNEYS

WELD POSITION

INVENTOR.
LYSLE V. ANDERSON
BY Richey & Watts
ATTORNEYS

INVENTOR.
LYSLE V. ANDERSON
BY Richey & Watts
ATTORNEYS

INVENTOR.
LYSLE V. ANDERSON
BY Richey & Watts
ATTORNEYS

INVENTOR.
LYSLE V. ANDERSON
BY Richey & Watts
ATTORNEYS

STRIP SPLICER

Filed Dec. 22, 1950

INVENTOR.
LYSLE V. ANDERSON
BY Richey & Watts
ATTORNEYS

United States Patent Office 2,814,343

Patented Nov. 26, 1957

2,814,343

STRIP SPLICER

Lysle V. Anderson, Warren, Ohio, assignor, by mesne assignments, to E. W. Bliss Company, Canton, Ohio, a corporation of Delaware Application December 22, 1950, Serial No. 202,343

10 Claims. (Cl. 164—49)

This invention relates to apparatus for shearing metal strip material and to joining sheared lengths of such strip to form a continuous strip. This invention is an improvement of the invention disclosed in my copending application, Serial No. 35,442, filed June 26, 1948 and now abandoned.

A general object of the invention is to join the ends of strips of steel or any other weldable metal quickly, accurately, and easily with the axes of the joined strips in exact alignment and with welds which are uniform along the length, and of high quality.

More specifically, it is a principal object of this invention to facilitate the cutting and splicing of metal strips, especially strips heretofore difficult to handle, such as very wide strips and strips of considerable thickness. Strips of this character are, to my knowledge, handled with a machine made in accordance with this invention more accurately, rapidly, and with greater facility than heretofore, which is made possible by a number of novel contributing features of the machine.

Another highly important object and advantage of this invention resides in the greater savings that it effects in the operation of a continuous strip mill with regard to material breakage and waste, and handling time of the sheet during the welding and rolling operations. Before this invention, it was difficult and time-consuming to weld the edges of sheets together by the submerged arc process or its equivalent. As a result it has been customary to weld the strip ends together by what is known in the strip-mill art as the flash welding process. However, it has been found that flash welds, although they may be comparatively rapidly made, often break in the strip mills during rolling. This causes a great deal of less because much of the strip runs through the mill after breakage and before the mill can be shut down, and there is a great deal of labor involved in restoring the mill to operation. Flash welds also produce high spots which tend to be brittle so that it is necessary to trim the brittle material away to obtain uniform thickness and to produce a strip having uniform ductility. If the brittle spot is too extensive, too much might be trimmed in an effort to obtain uniform ductility, which forms a weak zone subject to breakage.

The apparatus of the invention represents a combination of elements which all cooperate to provide a submerged arc weld which is not subject to these difficulties and yet the time consumed in the welding and handling of the sheets compares very favorably with the time required to perform a flash welding operation. Furthermore, the handling in virtually automatic and the accuracy of the machine is to great that perfect welds are obtainable with great regularity. The physical labor involved in joining the strip ends is much less than that heretofore required and the various elements of the machine so cooperate that the entire process may be under push-button control. Of course, the process performed by the machine eliminates the need for trimming of flash, which operation is a necessity where the flash welding operation is performed.

The general arrangement of the machine, that is the basic elements thereof, are like that in my copending application. For example, in carrying out the invention in accordance with a preferred form thereof, I provide a machine in the steel strip processing line in advance of the cold reducing rolls, which forms lengths of metal strips into a continuous metal strip. If one of my machines is inserted ahead of a pickling line it enables the pickling operation to be continuous and at the same time builds large coils for efficient cold rolling operations. I provide a pair of longitudinally spaced clamps with a platform in between carrying shearing and the welding means. The platform is made longitudinally reciprocable through a distance corresponding to the spacing between the shearing means and the welding means. The lengths of strip are fed through the clamps and the shearing means. The leading end of one length of strip may be overlapped with the tail end of the previous length of strip between the blades of the shearing means while the platform is in a position for operation of the shearing means.

The ends of the lengths of strip are sheared so that the edges coincide in position and conform in shape. If the strips are lapped, both are sheared simultaneously. Without unclamping the strip and assuring the retention of the abutting cut edges in the proper relation for high quality welding, the platform is moved longitudinally so as to cause the welding means to assume the position previously occupied by the shearing means. Weld heat is then applied progressively along the length of the cut edges so as to form a seam or welded joint which is produced with the cut ends of the strip in exactly the same position which they occupied when cut by the shearing means.

The shearing means and the clamps are so constructed that when the jaws of the clamp are closed for securing the lengths of strip they remain in the same plane as the cutting edge of the shearing means, thus, substantially avoiding any deflection or bending of the strip from its clamped position during the shearing operation. Also the shear is operated by fluid pressure means, which applies constant force during the cutting stroke, so as to avoid any shock or jarring which might tend to dislodge the strip material from the position in which it was held by the clamps.

As mentioned, I have made certain improvements in the aforesaid machine to facilitate the operation thereof, particularly in connection with the handling of wide or heavy strips of metal. For example, when the strips are relatively thick (such as quarter-inch or thereabouts) it is desirable to shear the tail end of the lead strip and the leading end of the following strip separately, because the sheared edges are better squared when the strips are single-sheared.

Some of the newer rolling mills are rolling strips up to 94 inches in width, which in the thicker sizes present serious shearing and handling problems. Accordingly, it is an object of the invention to provide for single shearing of the strips as mentioned above, as well as for repeated cropping of the long tails of the lead strips as well as tails at the leading edge of the follow strips. The tails of such strips wherein the strips are relatively wide may be quite long and would be difficult to handle if the tail were sheared from the strip in one piece.

The invention makes it possible to crop tails into single sheared strips while maintaining the alignment thereof. This is accomplished in a preferred embodiment of the invention by providing strip support or guide means adjacent the shear for deflecting upwardly and holding the cropped end of the lead strip above the plane of the upper fixed shear blade. In the preferred form, the strip deflecting or support means is controlled independently of the shear, preferably by means of the associated welding clamp. The arrangement is such that with the support in its lower position, the elongated tail of each lead strip may be cropped successively into relatively short pieces that are readily handled, after which the full width strip is sheared preparatory for welding without affecting the support which remains in its lower position. After the final shear is made the associated welding clamp is closed, which holds the strip in its aligned position and operates the support means to left the sheared end of the lead strip clear so that the leading end of a follow strip may be passed through the shear and beneath the sheared end previously cropped in a similar manner.

An important object of the invention is to avoid deflection of the strips during the clamping and shearing operations performed thereon. This is accomplished in a preferred embodiment of the invention by having the fixed jaw elements of the strip and welding clamps, as well as the fixed shear blade, all arranged in a single plane, and by further arranging all guide and drive rollers for the strip so that when the clamp jaws are closed both rollers are displaced from the plane of the strip end of the jaws, thereby permitting the strip to assume the aforesaid plane without interference. In order to facilitate passage of the spliced strip through the apparatus, the rollers are arranged so that when the clamp jaws are open the rollers engage and guide the strip clear of the clamp jaws and the shearing blades.

Another object of the invention is to facilitate the positioning of a new follow strip in the apparatus, as well as to provide a skid or chute for the cropped tail pieces of the lead strip. This is accomplished by providing a hinged platform at the entry side of the shear, which may be controlled selectively so that it can be lowered to act as a skid for the cropped tails of the lead strip and raised to act as a table or platform to assist the entry of the follow strip into the apparatus and between the shear blades.

Another object is to insure the longitudinal alignment and parallelism of the lead and follow strips before and during both the shear and the welding operations so that the spliced strip becomes, in effect, one straight, continuous strip. This is accomplished by providing laterally movable side guides associated with the various clamps which are arranged to move laterally and equally to engage the edges of the strips of any width and align them as described. In a preferred embodiment of the invention the side guides are manually adjusted for strip width, but are actuated by fluid motor means to grip and align the strips, which facilitates the interlocking of the control for the side guides with the other remotely-controlled elements in the apparatus. This construction also facilitates the handling of large and heavy strips, and the fluid motor may be interlocked with the control of the apparatus to provide automatic operation for aligning the strips as well as for clearing the strips during the passage of the spliced strip through the apparatus.

As described briefly above and in my aforesaid copending application, means are provided for shifting a carriage that mounts the clamp for the follow strip rearwardly, such shifting being accomplished by abutment of the shear and welding unit against the carriage, when the unit moves to its weld position. This spaces the sheared edges of the strip, which is useful in cases where the strip is so thick that it requires such spacing for welding purposes.

Another object of the present invention is to provide for a rapid and accurate adjustment of the amount of spacing so obtained. This is accomplished by having a pair of threaded abutment rods, preferably on the clamp mounting carriage, interconnected by a manually-operated worm shaft for simultaneous and equal advance and retraction of the rods which in turn controls the amount of shift when they are struck by the abutment means on the shear and welding unit.

Another feature of the apparatus resides in the provision of means for supporting the strip between the welding clamp and the exit clamp during the welding operation. This is desirable where thin gauge sheets are employed. It is made possible by a novel telescoping roller arrangement which is automatically brought into supporting position during welding, but which is mounted so as to not interfere with the parts when they are in the shearing position.

The manner in which these and other objects and advantages are attained will be apparent from the following detailed description of a preferred embodiment of the invention.

Figure 1:
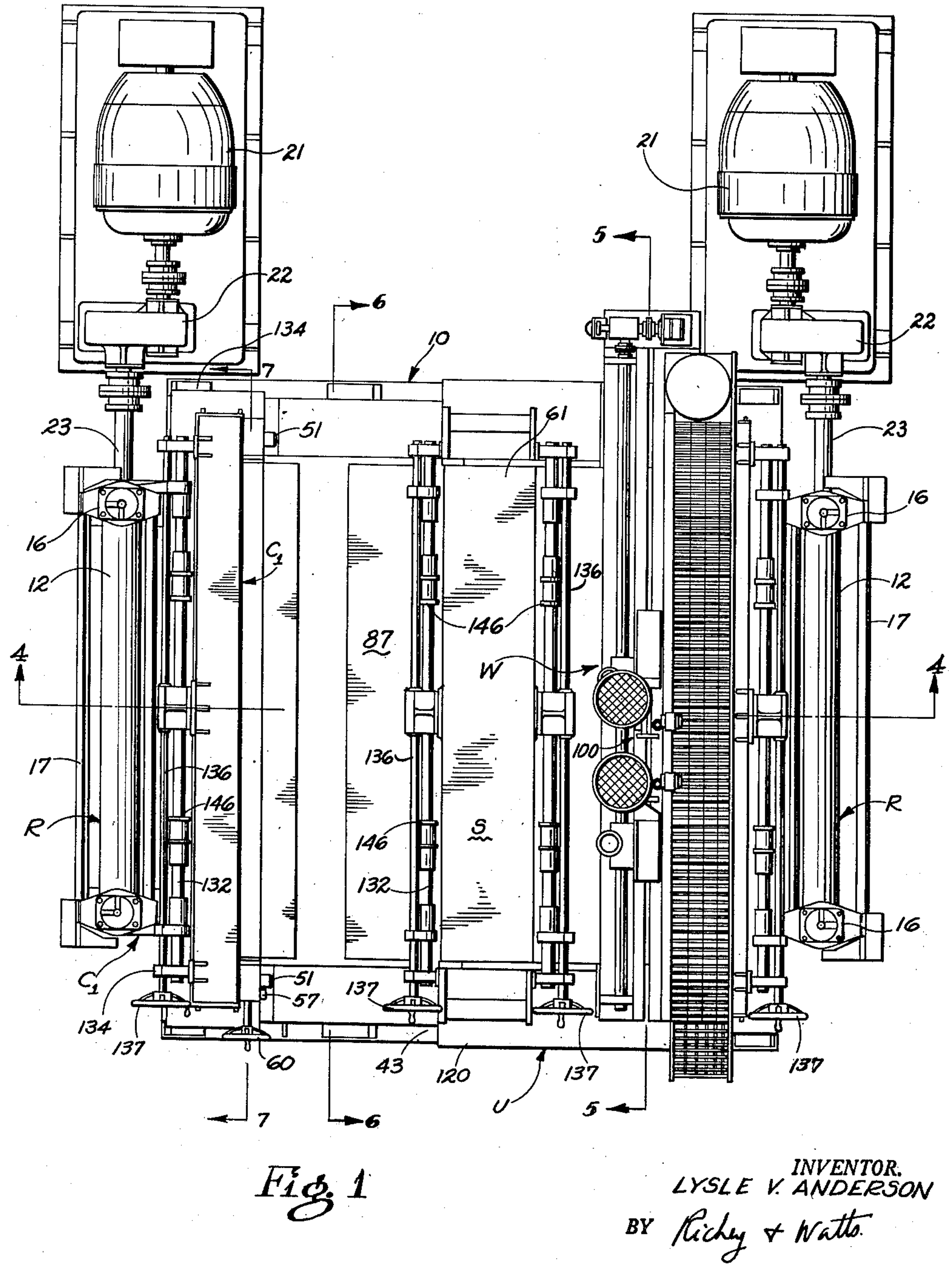
Fig. 1 is a plan view of the apparatus.

The apparatus comprises heavy frame structure indicated generally at 10, mounted over a pit and may include several major units. The frame structure has at each end thereof strip clamps C and $C_1$ with the clamp $C_1$ being mounted on a carriage longitudinally movable on the frame and disposed at the entrance end of the apparatus. Associated with each strip clamp is a roller assembly R for guiding and driving the strips through the apparatus. Longitudinally slidable on the frame structure between the strip clamps is a shear and welding unit U which has the same general function as that in my aforesaid copending application. The unit includes strip shear mechanism indicated generally at S, and a welding clamp indicated generally at W. Each roll assembly R has a lower roll 11 and an upper roll 12. The upper roll is mounted for vertical motion in a frame 13 by means of blocks 14 actuated by a pair of fluid motors 16, suitably connected to the roll mounting blocks. In order to maintain the upper roll parallel with the low one, cross shaft 17 has fixed on each end thereof pinions 18, this assembly being mounted in the frame 13 for the rollers. Racks 19 are formed on the blocks 14 for engaging the pinions and maintaining the roll alignment.

The lower roll is driven by a suitable motor 21 through a reduction gearing 22 and an output shaft 23 from the reduction gearing. The strip clamps C and $C_1$ are associated with the respective roller assemblies and are virtually of identical construction. Each clamp includes upper fixed clamp jaws 31 supported by a sturdy frame structure 32. The lower jaws 33 are slidably mounted in the frame and are actuated by fluid motor means 34 pivoted to the clamp frame extension 35 as at 36, as best seen in Fig. 7, and having an extension 37 connected to the lower jaws 33.

Figure 2:
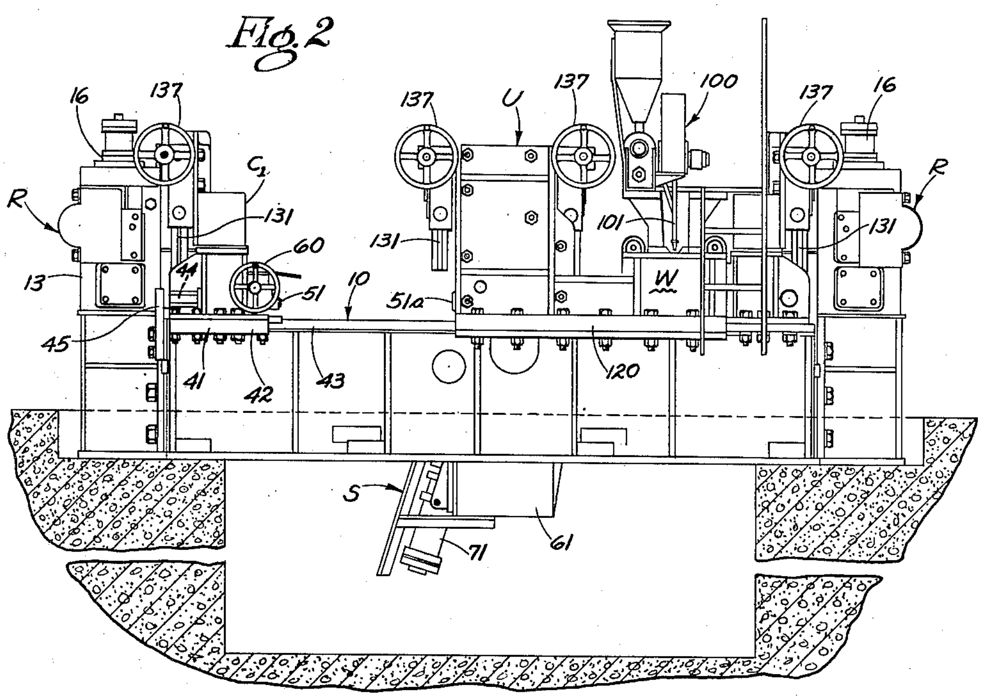
Fig. 2 is a side elevation thereof.
Figure 3:
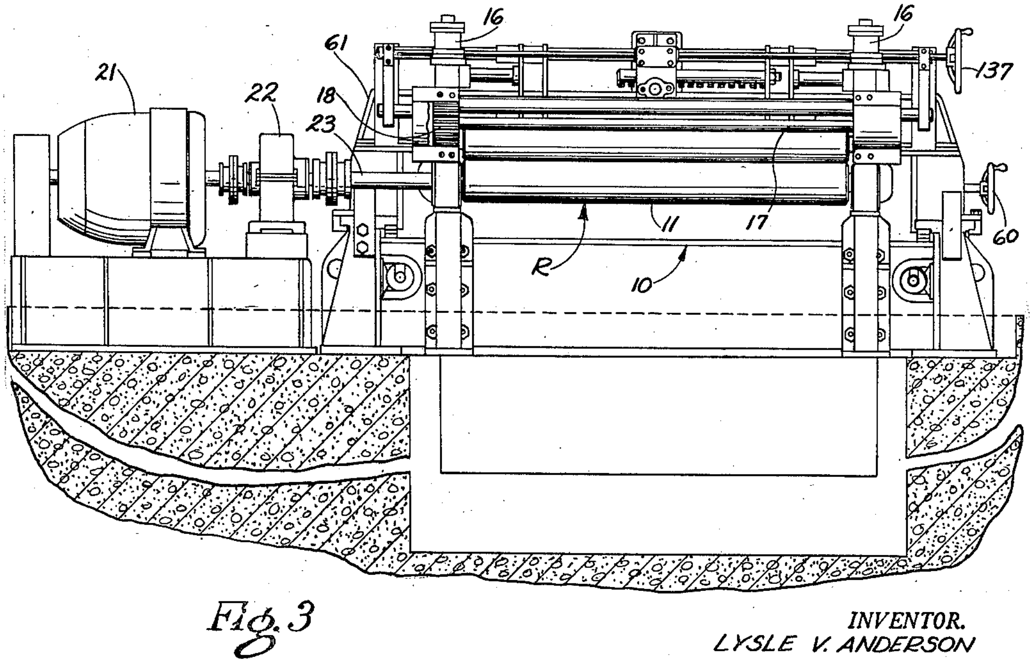
Fig. 3 is an end elevation thereof.

In order to maintain parallelism with the movable clamp jaw to the fixed jaw pinions 38 are fixed to a cross shaft 38*a* mounted in suitable brackets on the lower jaw and meshed with racks 39 attached to the framework that supports the fixed jaw. Clamp $C_1$ is mounted on a carriage indicated generally at 41 and (as seen in Figs. 2 and 7) guides 42 are provided permitting reciprocation of the carriage on ways 43 forming a part of the main framework 10 for the apparatus.

Figures 7, 8:
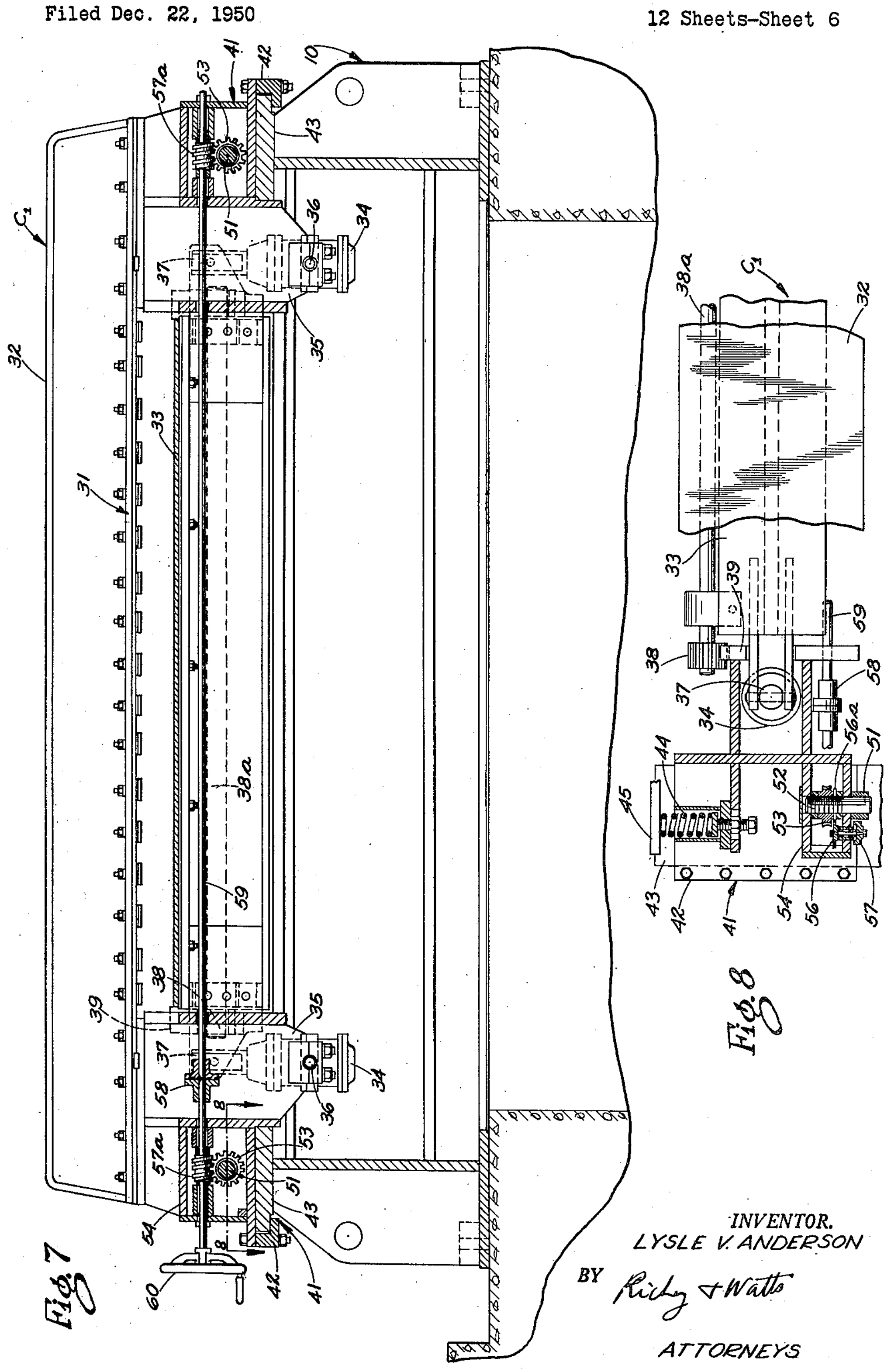
Fig. 7 is a section taken through 7—7 of Fig. 1.
Fig. 8 is a fragmentary section showing the abutment means adjustment.

Referring to Figs. 7 and 8, it can be seen that means are provided for adjusting an abutment member on the carriage 41 mounting the clamp $C_1$ in order that the carriage may move backwardly when engaged by the welding unit to space the sheared edges of strips a desired degree for welding purposes. To this end a pair of abutment rods 51 are threaded as at 52 to receive an axially restrained threaded worm wheel 53, the assembly being mounted in a box-like housing 54 on the carriage 41. Rotation of the worm wheel 53 is indicated by small gears 56 and 56*a* arranged in mesh with gear 56*a* attached to the worm wheel 53 and with an indicator 57 attached by a suitable shaft to the gear 56, thereby providing the means for vernier indicator adjustment. A worm 57*a* is affixed to a shaft and coupled by means of a coupling 58 to a cross shaft 59 which has formed on the end thereof another worm 57*a* engaging a duplicate of the structure just described. A hand wheel 60 is provided on one or both sides to rotate the worms and simultaneously adjust the abutment rods 51. The carriage 41 is urged forwardly by a spring 44 engaging the carriage at one end and a stop 45 on the main frame 10 at the other end.

The shear and welding unit U has a heavy structural frame section 61 with a horizontal portion that mounts a bed 62 for the upper fixed shear blade 63 of the shear assembly S. The upper blade 63 is disposed in the same plane as that containing the fixed upper clamp jaws 31 of the two strip clamps C and $C_1$. A carriage 64, guided for vertical reciprocation in the frame 61, mounts the lower or movable shear knife 65. Shear knife carriage 64 is reciprocated by a link 66 pivoted thereto into a crank 67 pivoted to the frame as at 68 and pivoted at 69 to the piston mounted in the fluid pressure cylinder 71, which cylinder is pivotally mounted on the shear frame 61 as at 72.

A spring-loaded lateral strip clamp or gig is provided to securely hold the strip at the shear during the clamping operation. The gig 81 is slidably mounted in the carriage 64 of the movable shear blade and is urged outwardly by a plurality of springs 82, suitable stop means being provided to limit the outward motion of the gig member 81. Springs 82 seat in a support 83 attached to the carriage 64 of the shear by bolts 84. Platform means are pivotally connected as at 86 to the gig bar 81. In order to act as a combination guide or platform for threading a new strip into the apparatus, as well as for a discharge chute for cropped tail ends of a lead strip, the platform 87 may include rollers 87*a* to facilitate passage of the strip through the apparatus and is actuated by fluid motor assembly 88 pivoted at one end to the platform and suspended by means of links 86*a* from pivot 86 mounted on the gig bar 81. A lower cross shaft 89 connects through the cylinder and mounts spaced rollers 89*a* that are flanged and ride on a fixed vertical track 89*b*.

Platform 87 has three functions, it can be lowered to form a scrap chute, raised to form a guide for a strip entering between the shear blades, and it supports the strip in the plane of the upper shear blade during shearing. Since the platform is suspended from the gig 81, and due to the roller and track construction, the lower shear blade can continue upwardly past the shear plane 100 without disturbing the position of the platform.

Figure 4:
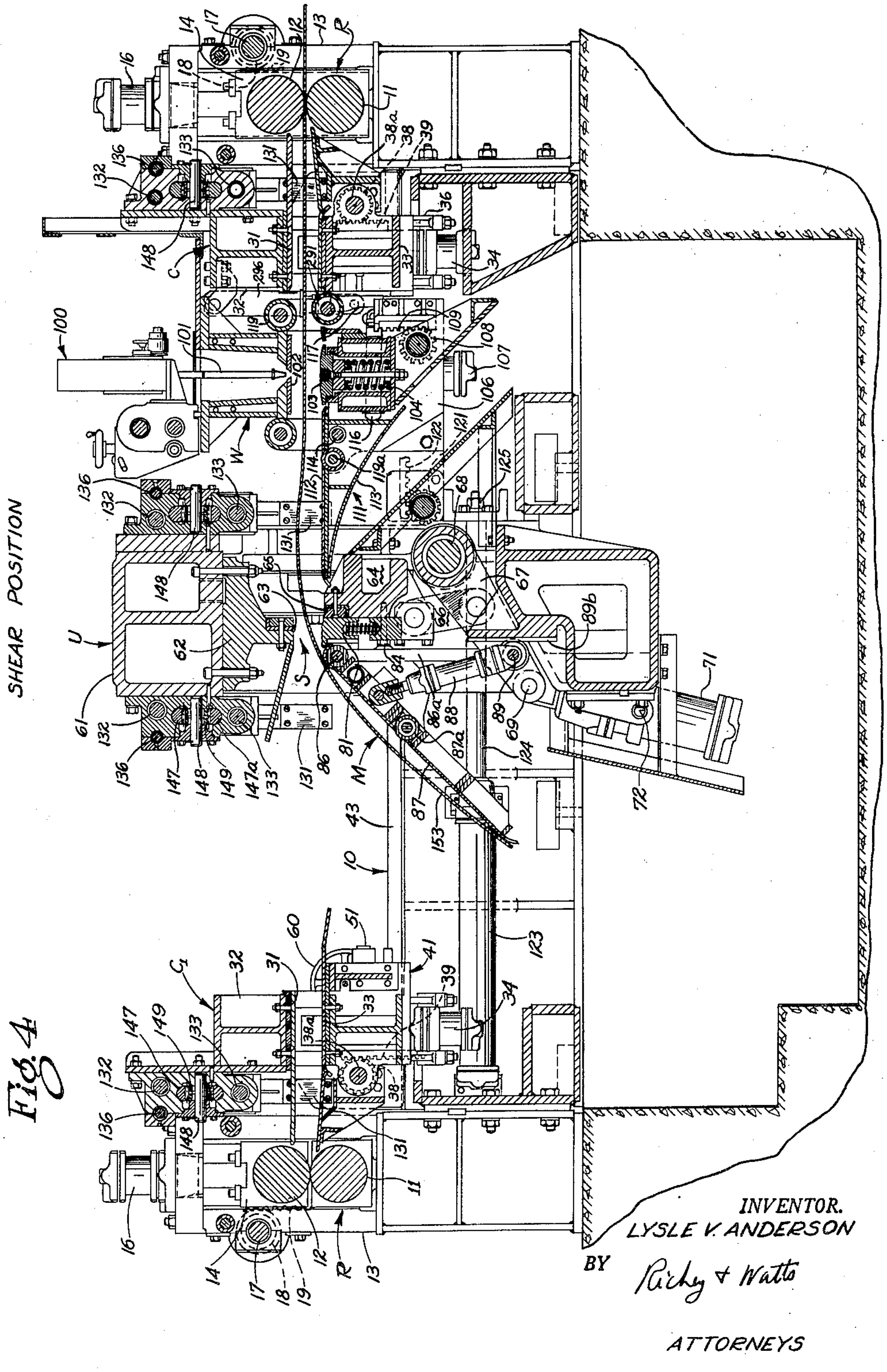
Fig. 4 is a longitudinal section taken on 4—4 of Fig. 1.
Figure 9:
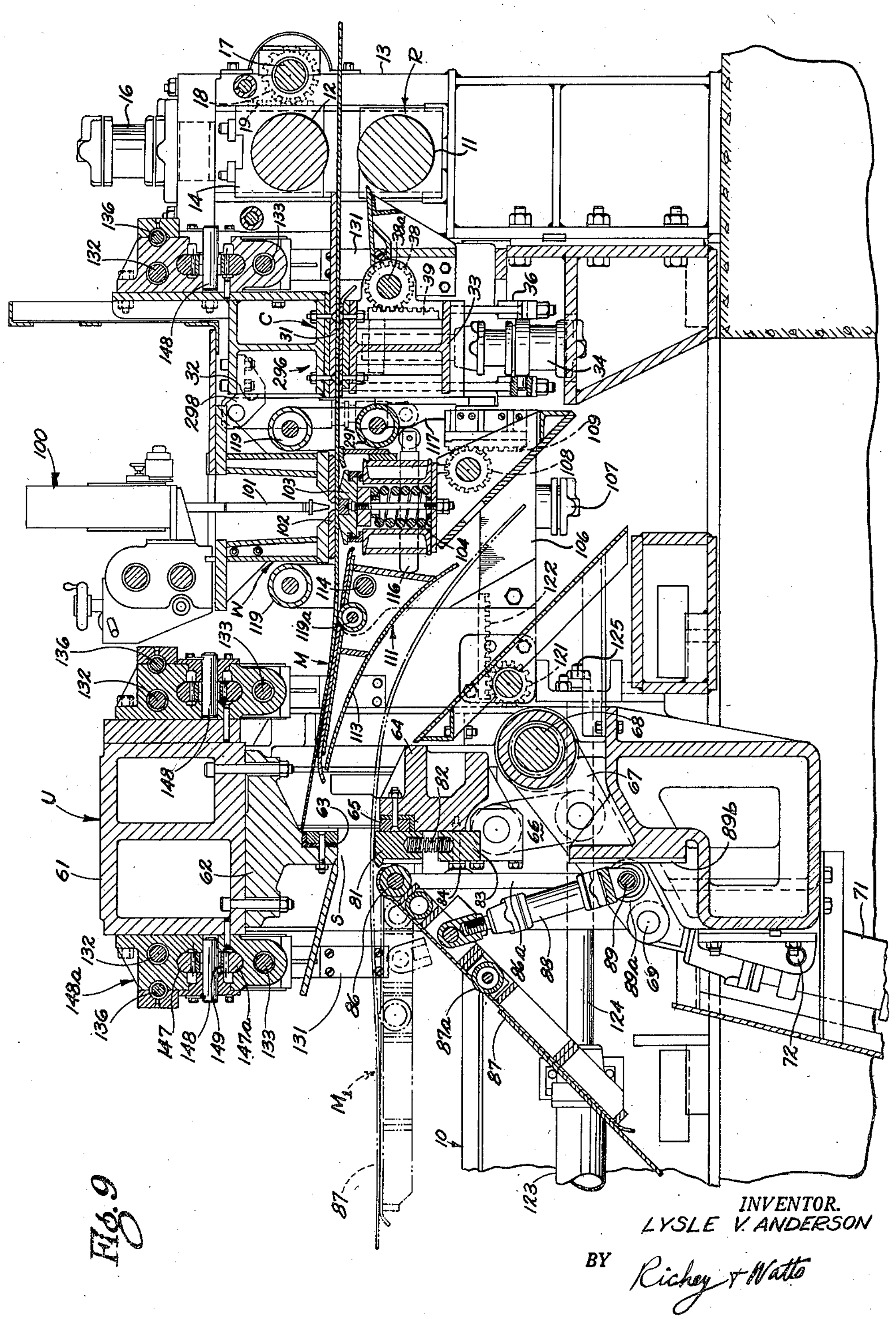
Fig. 9 is a fragmentary longitudinal section similar to Fig. 4 but enlarged, showing the strip support means in its upper position.
Figure 10:
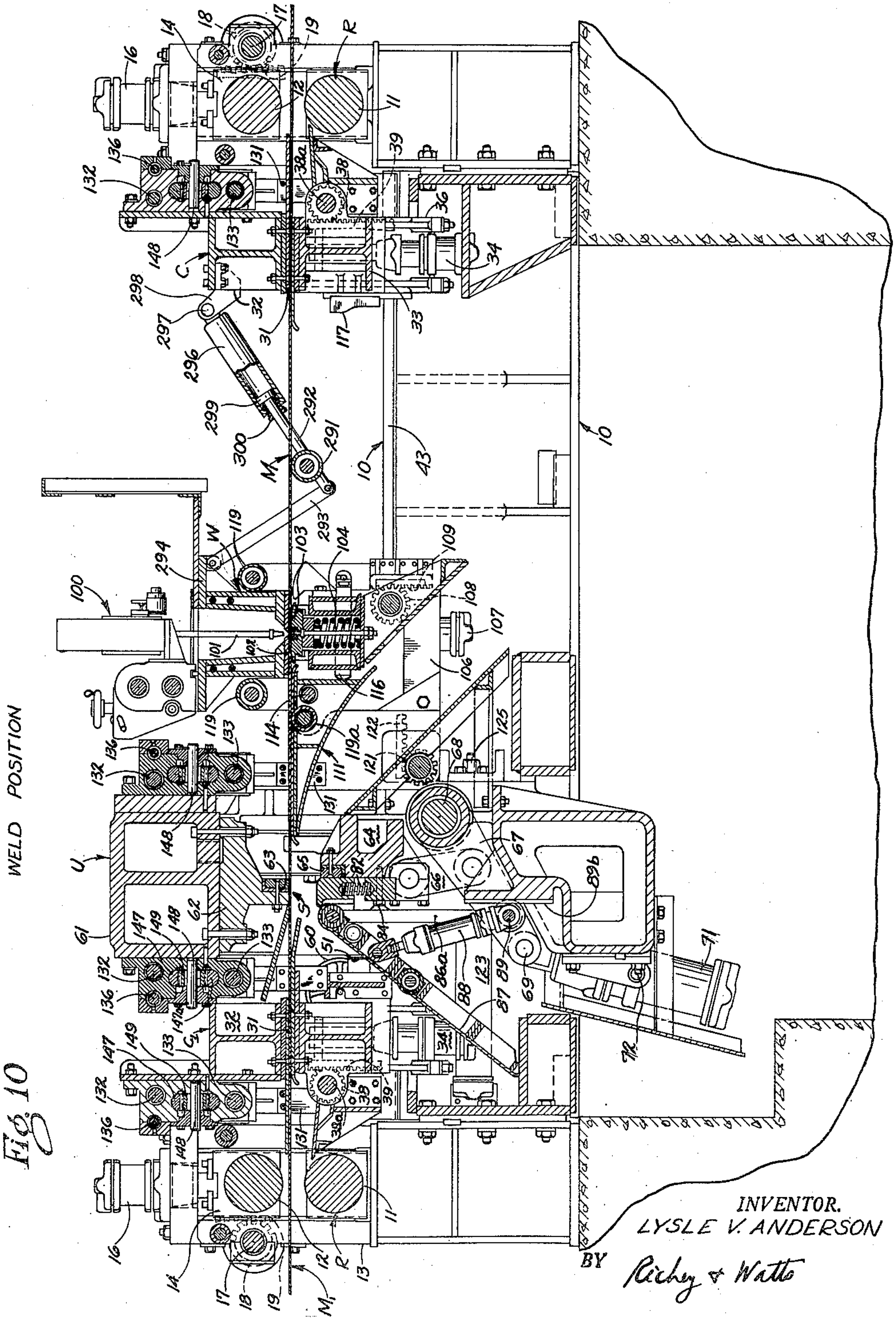
Fig. 10 is a section similar to Fig. 4 showing the apparatus in its weld position.
Figures 11, 12, 13:
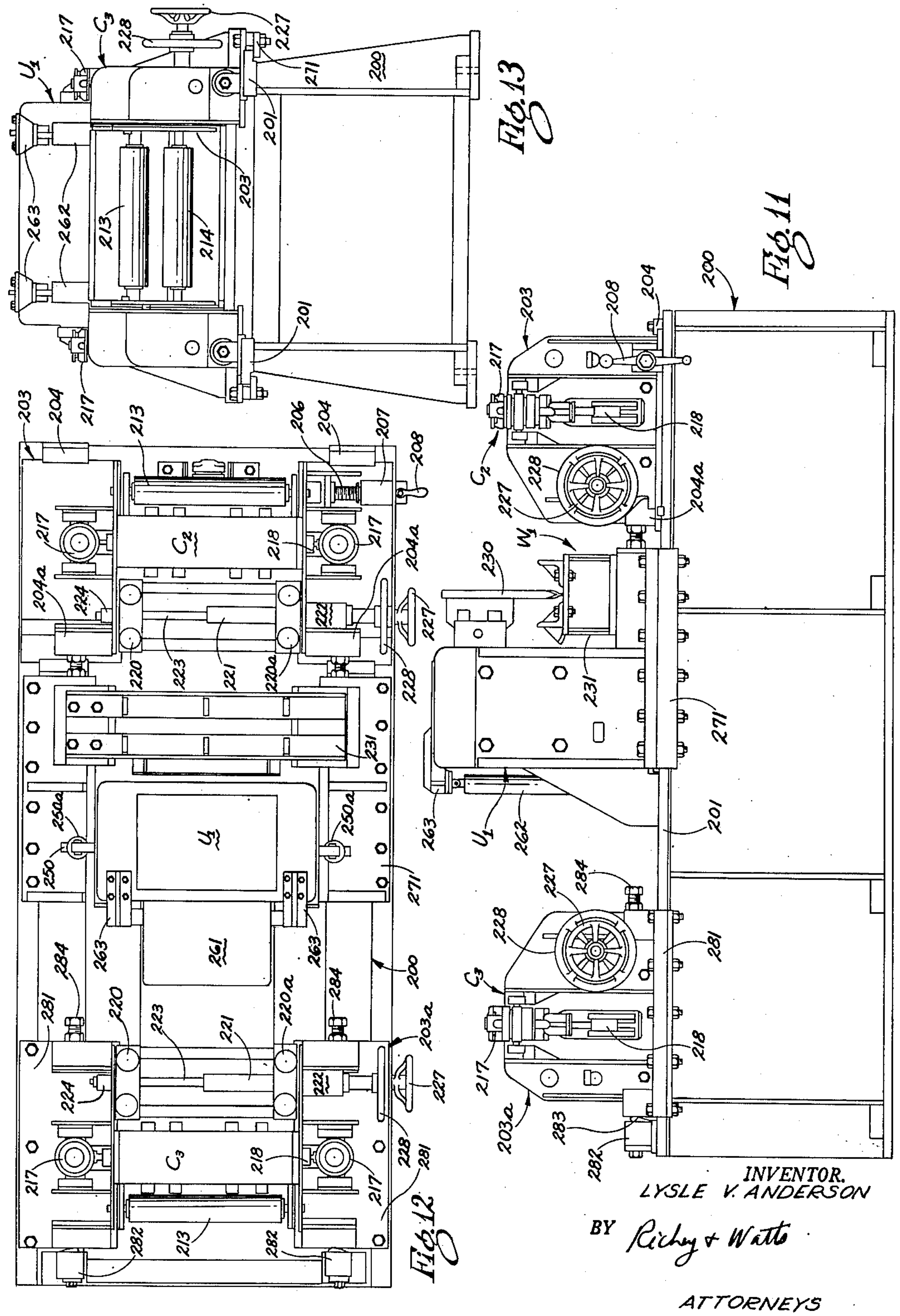
Figs. 11, 12 and 13 are respectively side, plan and end views of a modified construction.

The platform 87 is shown in the position it assumes for receiving cropped tail ends of the strip in Figs. 4 and 9, and it is shown in its platform functioning position in broken lines in Fig. 9. As seen in Fig. 10, the platform is lowered to its lower position for clearance purposes when the shear and welding unit is moved to its weld position.

Figure 5:
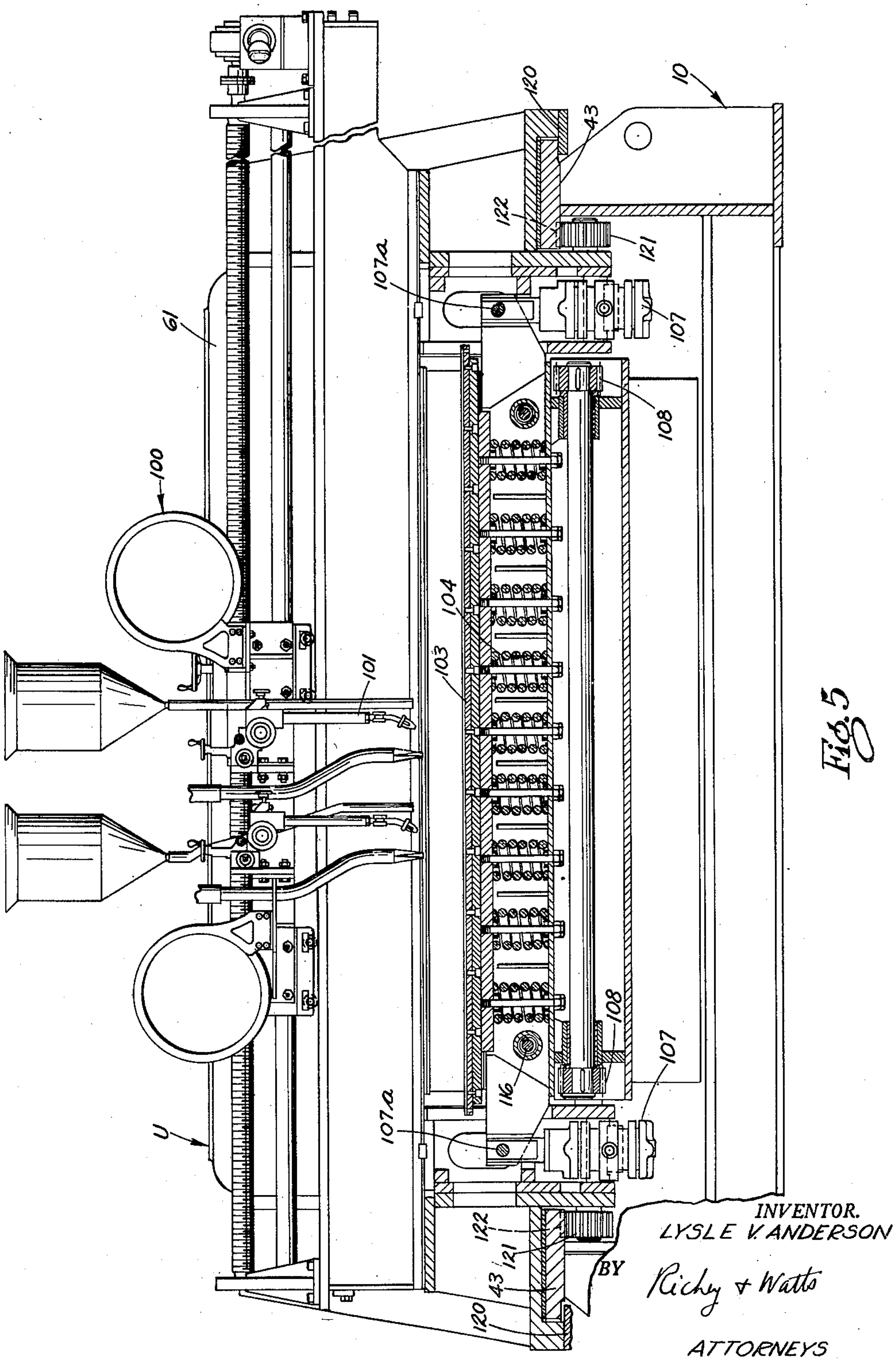
Fig. 5 is a lateral section taken on 5—5 of Fig. 1 with the support platform removed for clarity.

On the shear and welding unit is fitted a welding assembly indicated generally at 100 having weld electrodes 101, details of this assembly forming no part of this invention, and an assembly suitable for the purpose being known in the trade and described in detail in my aforesaid copending application. A welding clamp W is associated with the welding assembly which has a fixed slotted upper jaw 102 in the plane of the upper jaws of the strip clamps. The lower jaw 103 is spring-loaded by means of springs 104, there being suitable stops to limit the outward motion of the lower jaw under the force of the springs. The lower jaw is mounted on carriage means 106 slidably retained in the frame of the welding unit for vertical reciprocation and actuated by fluid motor means 107 connected to the lower jaw by means of pins 107*a*, as seen in Fig. 5.

In order that the welding clamp be maintained parallel to the fixed jaw pinions 108 are connected to a cross shaft mounted on the movable frame structure of the clamp and meshed with racks 109 fixed to the frame of the shear and welding unit U. These racks appear in Figs. 2 and 4 as well as in Fig. 10.

A strip support and deflector is mounted for motion with the movable lower jaw for the welding clamp. This deflector, indicated generally at 111, has an upper plate 112 positionable parallel to the plane containing the upper or fixed clamp jaws and shear plate and a covered lower plate 113 serving to act as a guide and deflector for a follow strip as illustrated in Fig. 9. The support 111 is pivoted on a member movable with the lower welding clamp jaw as at 114, and is actuated by a plunger 116 spring-mounted in the lower clamp jaw and engageable with a cam 117 fixed to the framework that moves with the lower clamp jaw.

As seen in Fig. 9 when the lower clamp jaw is raised, plunger 116, which has a roller adjacent cam 117, rides upon a high portion of the cam and causes the support 111 to be tipped upwardly so that the end thereof adjacent the shear blade is at least as high as, or higher than, the fixed shear knife 63. The lower welding clamp jaw has rollers 119 mounted thereon, which rollers are below the plane of the fixed jaw when the clamp is open (as seen in Fig. 4), and above that plane when the clamp is closed (as seen in Figs. 9 and 10).

The entire shear and welding unit is mounted for reciprocation on ways 43 of frame 10 by means of guides 120. In order to maintain the alignment of the shear and welding unit pinions 121 are keyed to a cross shaft mounted in the unit and maintain the unit in alignment by their engagement with racks 122 formed on the ways 43 of the main frame. The shear and welding unit is reciprocated by means of cylinders 123 and a piston rod 124 attached to the frame of the shear and welding unit as at 125.

Figure 6:
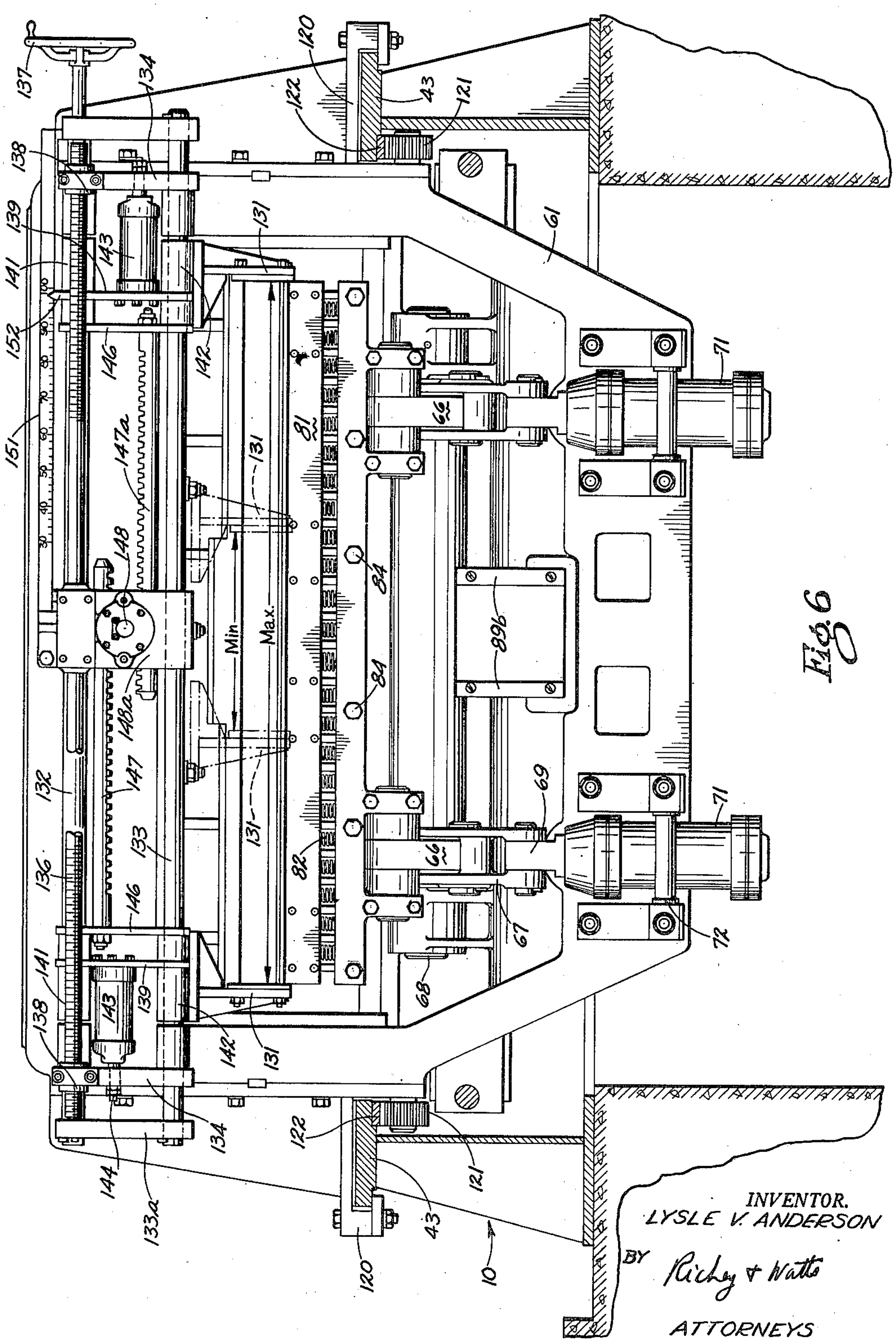
Fig. 6 is a lateral section taken on 6—6 of Fig. 1.

Means are provided adjacent each strip clamp and on the shear and welding unit for accurately aligning the lead and follow strips edge-to-edge regardless of their size and weight. For this purpose four pairs of side guides 131 are mounted for lateral motion on the apparatus, there being two pairs of each unspliced strip portion arranged so that the strips are meshed edge-to-edge and have their centerlines coincide with the longitudinal centerline of the apparatus. In order to mount the side guides and to actuate them, spaced rods 132 and 133 extend across the apparatus and are fixed to the associated parts thereof at their ends, as best seen at 133*a* in Fig. 6, which shows the side guide assembly for the entry end of the shear and welding unit. Mounted on rods 132 and 133 are opposed carriages 134 which are actuated by an oppositely-threaded screw 136 having a control hand wheel 137 mounted and threaded to nut means 138 and members 134. Independent carriage means 139 are mounted on rods 132 and 133 as at 141 and 142 respectively, and serve to mount the side guide members 131 for the aforesaid sliding motion. The side guides are operated independently of the carriages 134 by fluid motors 143 having a cylinder connected to the plates 139 and a piston connected as at 144 to the carriage 134. Plates 146 are likewise mounted on rods 132 and 133 for motion with plates 139 and side guides 131. The plates 146 have attached thereto oppositely-extending racks 147 and 147*a*. These racks are for the purpose of insuring simultaneous and equal motion of the side guides. To this end pins 148 are mounted in a fixed support 148*a* and carry pinions 149 (as best seen in Fig. 9) which mesh with the racks.

A scale 151 graduated in stripped width in inches cooperates with a pointer 152 formed on one of the plates 139 at one side of the machine to provide a preliminary setting for the side guide mechanisms.

It will be noted that with the construction just described, once the side guide assemblies are initially adjusted so as to be equidistant of the centerline of the apparatus, they will maintain such alignment. It will also be noted that the scale and indicator means 151 and 152 is only a nominal indicator of strip width, so that the four side guide hand wheels 137 need only be manipulated with the motors retracted to an indication of a strip of the desired width or wider, and such strip will pass between the side guides and be aligned so long as the nominal setting is wide enough and at the same time within the range of the stroke of the fluid motors. With the machine adjusted, nominally aligned under these conditions, when the fluid motors are actuated all side guides will move in to engage the strip edges and will not stop such motion until such edges are engaged, whereupon due to the action of the racks the strip edges will be so aligned that they are parallel and equidistant from the centerline of the apparatus, this being true even though the lead and follow strips themselves may vary slightly in width, and even though the nominal adjustments are not exact or alike.

Figure 17:
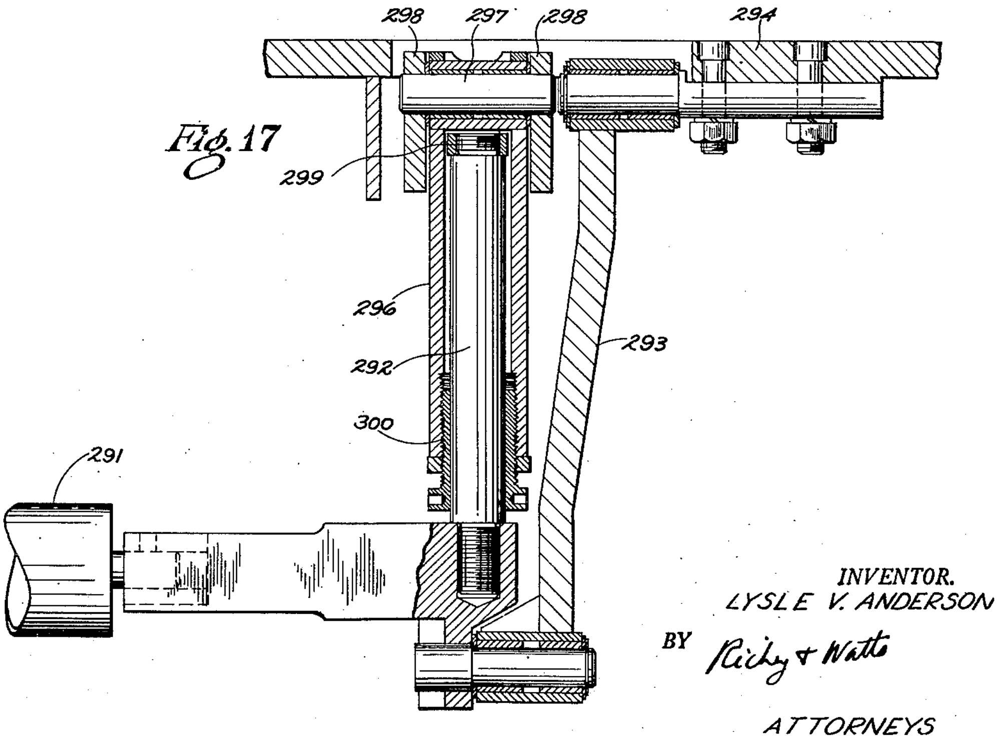
Fig. 17 is a longitudinal section through the strip support roller actuating linkage located intermediately the fixed strip clamp at the exit end of the machine and the welding unit strip clamp.

The preferred form of the apparatus includes means for supporting strips, particularly light gauge strips, intermediate the welding clamp and the exit clamp. This supporting action most clearly appears in Fig. 10. Here a roller 291 is pivotally mounted on a piston rod 292 supported at its lower ends by means of links 293 suspended from brackets 294 mounted on the welding head. These parts are also seen in more detail in Fig. 17. A cylinder 296 telescopically receives piston rod 292 and the upper end of the cylinder is pivoted on a pin 297 mounted between ears 298, which ears are bolted to the exit clamp frame. The piston rod has an abutment 299 which, as best seen in Fig. 17, cooperates with an adjusting nut 300 to determine the position of the roller in the "weld" position. With the device in the weld position (as shown in Fig. 10) adjusting nut 300 is set so that the roller 291 will support the strip exactly in the plane of the upper clamp jaws. Due to the telescopic construction of the device, and its mounting by means of linkages, it will fold out of the way without interference between the welding unit and the exit clamp when the device is in the shear position. This also lowers the top of roller 291 below the plane of the upper or fixed clamp jaws to the pass line, thereupon providing support for the strip between welder clamp and exit clamp while the strip is passing through the apparatus.

Figure 18:
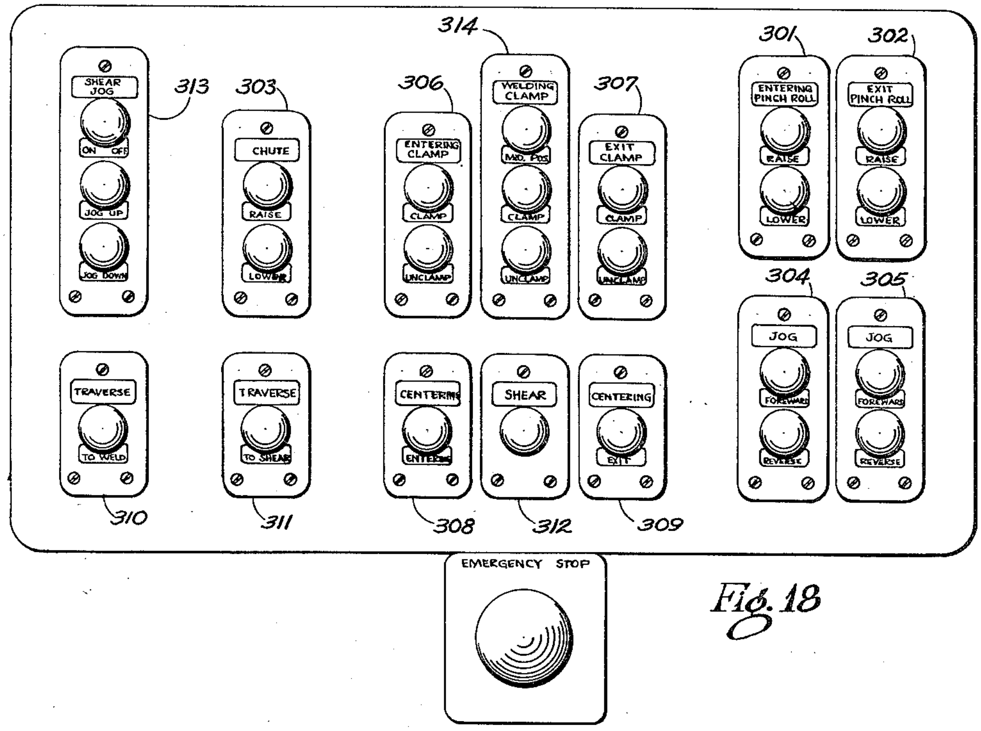
Fig. 18 is a plan view of a push button control panel for the machine.

In view of the provision of various hydraulically-controlled elements in the preferred embodiment of the invention, all of which cooperate to produce accurately aligned edges in all planes and a perfect weld, the unit is readily adaptable in electrohydraulic control from a master push-button panel. A typical panel installation is shown in Fig. 18 which reveals how complete control of the entire process may be provided to the operator. The entering and exit pinch rolls for initially positioning the strips are controlled by push-button groups 301 and 302 respectively. If the chute is desired to be raised or lowered, panel groups 303 are manipulated. If short (jogging) motions of the strip by means of the pinch rolls are desired, the jogging button groups 304 and 305 are manipulated. The entering and exit clamps are, when desired, closed and opened by panel groups 306 and 307 respectively. Before the clamps are closed the centering apparatus may be operated at the entering and exit sides of the machine by means of panel groups 308 and 309.

The position of the shearing and welding head is controlled by the push-buttons 310 and 311, which respectively direct it to its welding and to its shearing position. The shear may be set into motion by means of the push-button 312. If it is desired to "jog" the shear in order to position it for purposes of adjustment, alignment, or replacement, panel group 313 is employed. Panel group 314 is utilized to control the welding clamp after the device has been prepared for the welding operation.

Having completed a detailed description of the preferred form of apparatus, the operation thereof will now be briefly described. Details of the interlock system for the motor that drives the strips and the various hydraulic piston and cylinder assemblies that operate the clamps, shear side guides, and the like are not described. The sequence of operations of these parts will be explained, which sequence is preferably controlled by manually-controlled push buttons or valves for the various motor means, or by a system wherein such push buttons or valves are interlocked by relays or the like to insure sequential operation of certain elements in the apparatus. It is considered that where various interlocks are required, it is within the skill of those skilled in this and the control art to provide the same without the exercise of invention, and so details of the electrical and valve control system are not explained, a typical control panel having been described in connection with Fig. 18.

It will first be assumed that the operations are to be performed on strips that are of such a size that it is desirable to shear them singly. Referring to Fig. 4, the tail end 153 of a lead strip M is shown in the apparatus. The weld clamp and clamp C are open and the movable roller 12 is advanced by fluid motor 16 to press against lower roller 11 and grip the strip in driving engagement. It will be noted that the rollers are so arranged that the strip is held clear of the clamp jaws. The side guide motors associated with clamp C and with the exit end of the shear will have been activated to insure centering of the strip in the apparatus and retracted for clearance. Platform motor 88 is actuated to retract the platform to act as a skid for the cropped tails of the lead strip.

For the initial crop shearing operation the strip is stopped under the shear knife leaving the desired crop end 153 of M on scrap chute 87. The shear is actuated, and the crop falls down the chute.

The motor driving the exit roller R may then be run in the reverse direction a short distance, and another short portion of the tail cropped with the shear. This is continued until the full width of the strip is between the shear blades.

Before the final shear is made on this strip, pinch rolls R are opened; side guides 131 are operated to center the strip about centerline longitudinally (and while still engaged with the strip) clamp C clamps the strip. The control circuits are so interlocked that the guides 131 then retract automatically. The welding clamp W is then closed, which in turn elevates table 112 and holds the strip in a flat horizontal position in the same plane as the bottom of the upper knife 63.

When the final shear is made, the lower knife holder 64 travels upward, at the same time carrying platform 112 and deflector 111 with it to the top of its stroke; and by means of spring loaded pin 116 it is held in the up position, as seen in Fig. 9. This completes all shearing preparation of the tail end of lead strip, and the follow strip $M_1$ may then be threaded between the shear blades and deflected downwardly as by plate 113 on the strip end support 111.

The follow strip is threaded into the machine by closing the drive rollers R, and raising platform 87 by means of the fluid motor 88 to its horizontal position. Any tails or narrow sections of the follow strip may be successively cropped until a full width shear will be obtained.

Before the final shear the pinch rolls R are opened, side guides 131 are actuated to center the follow strip, and while holding the strip about the centerline clamp $C_1$ is closed.

The final shear on the follow strip is now made on exactly the same shear line as the final shear which was made on the lead strip, thus producing a matched cut edge on both strips.

After the shearing operation is completed, entrance platform 87 is lowered and the welding clamp opened, because the clamps C and $C_1$ firmly hold the strips in postion. The shear and welding unit is next moved to its welding position by motor 123 (as shown in Fig. 10) and if a spacing between the sheared ends is desired, the welding unit strikes the properly adjusted abutment rods 51 and slides the carriage mounted clamp $C_1$ rearwardly on ways 43. The welding clamp is now closed and the welding unit 100 completes the welding operation of the strip. Both shearing and welding are performed without any tendency of the clamps, rollers, and the like to deflect the strip from the common plane of the fixed clamp jaws and the fixed shear blade.

After the welding is completed the welding clamp W is opened, as are the strip clamps, and the upper drive rollers 12 forced against the strips and in driving engagement therewith. The side guides will have been retracted by their fluid motors and the shear and welding unit be returned to its shear position. Now the rollers can rapidly drive the strip through the apparatus and there is little wear of the associated clamp jaws. Similiarly, rollers 87*a* in the platform 87 and rollers 119 and 119*a* at the weld clamp help prevent abrasion of the welding jaws by the strip.

In case it is desired to shear both strip ends simultaneously the actuating mecahnism for the support member 111 may be disconnected and the support removed or fastened in its horizontal poistion. With this arrangement the follow strip $M_1$ will be inserted to rest on top of the lead strip M with the platform 87 in its lower position as shown in Fig. 4. With the follow strip in place above the lead strip M and between the shear blades and with the side guides activated to align all strips, both strip clamps C and $C_1$ may be closed and the shear actuated to simultaneously shear both strips. The tail of the lead strip will slide along platform 87, and the tail of the follow strip will be removed manually from the machine before the welding operation takes place. However, the interrelation of the strips, clamps, and shear knives is such that during the critical clamp and shearing operations, the strips will be undeflected from the plane that they normally assume determined by the fixed clamp jaws and shear blade.

The form shown in Figs. 11 to 15 has a mode of operation generally like that of the preferred embodiment of the invention, but has certain differences which will be understood as the following description proceeds. The bed or framework of the apparatus is indicated generally at 200, and is formed with longitudinal ways 201. At the exit end of the apparatus is a carriage, indicated generally at 203, mounted on the ways and guided for lateral motion by guides 204 and 204*a*. A screw 206 is rotatably attached to the carriage 203 and is threaded in a fixed block 207, and manipulated by handle 208. The structure just described provides for a lateral shifting of the entire carriage 203 so that one end facilitates the alignment of the lead strip with the strip that follows it.

Mounted on carriage 203 is the exit strip clamp assembly $C_2$, which includes a guide roller assembly. The upper jaw 210 of the clamp is fixed and the lower jaw 211 is movable, it being understood that the clamp and guide roller assembly on the entrance carriage 203*a* is a substantial duplicate of that just described. Mounted for motion with the lower jaw are a pair of brackets 212 which mount the upper guide roller 213. A lower guide roller 214 is fixed in the carriage, brackets 212 being slotted as at 216 to carry the lower roller shaft. The fixed and movable rollers are so arranged that when the clamp is open they both engage a strip, such as M, and hold it clear of both clamp jaws. Conversely, when the lower clamp jaw moves upwardly to clamp the strip against the upper jaw, the upper roller 213 is lifted above the plane of the upper jaw so that the strip clears both of the rollers. This prevents distortion of the strip by the rollers. In order to raise and lower the lower jaw hydraulic cylinder means 217 are mounted on the carriage, and have a piston connected to a block 218 which forms an extension of the lower jaw, there being such cylinders disposed at each end of the jaw. The same construction is employed at the entrance end of the apparatus.

Figure 16:
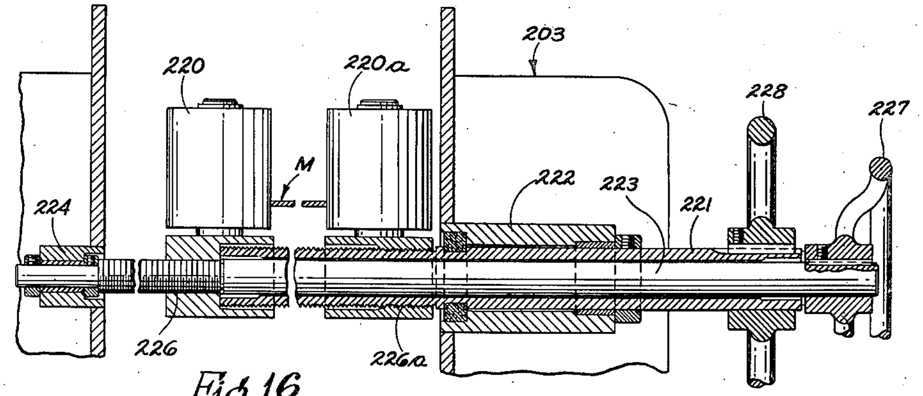
Fig. 16 is a fragmentary broken section through the guide roller.

Adjustable side guides are provided in this embodiment of the invention in the form of opposed rollers 220. The means for adjusting the rollers are best seen in Fig. 16, and include an outer sleeve 221 mounted in a bearing 222 on the carriage by suitable machine design elements. Within the sleeve is a shaft 223 mounted in the opposite side of the carriage as at 224, which mounting restrains the shaft against axial motion. The shaft 223 is threaded as at 226 to the block that supports the rollers 220 whereby rotation of the shaft moves the rollers laterally. The sleeve is threaded to the other block as at 226*a*, whereby rotation of the sleeve moves rollers 220*a* laterally. The shaft and the sleeve are manually controlled by hand wheels 227 and 228 respectively. Adjustable side guide rollers are provided at both the exit and the entrance ends of the apparatus. With proper manipulation of the hand wheels, the side guides can be adjusted to center both the lead and follow strips within the apparatus, and any offsetting between the two strips can be removed by manipulation of handle 208 to laterally adjust the carriage 203, which supports the lead strip.

A welding head 230 is mounted for lateral motion on the shear and welding unit $U_1$, the details of which form no part of the invention. There is a welding clamp W having an upper fixed jaw 231 disposed in the same plane as that containing the other clamp jaws and a lower movable jaw 232. The lower jaw is moved by a pair of vertical cylinders with pistons pivoted to brackets on the lower jaw. This construction is like that shown in Fig. 5 for the previously described machine. The shear structure $S_1$ has an upper fixed knife 241 which is disposed in the aforesaid plane so that the strip is not distorted from the plane during the shearing operation. The lower shear knife head 242 is mounted in suitable vertical guides, and is connected by means of links 243 to cranks 244 pivoted to the bed of the shear and welding unit $U_1$ at one end, and connected to piston and cylinder assemblies 247 at the other end. The latter assemblies are pivotally mounted on the bed of the shear and welding unit as at 248.

Figure 14:
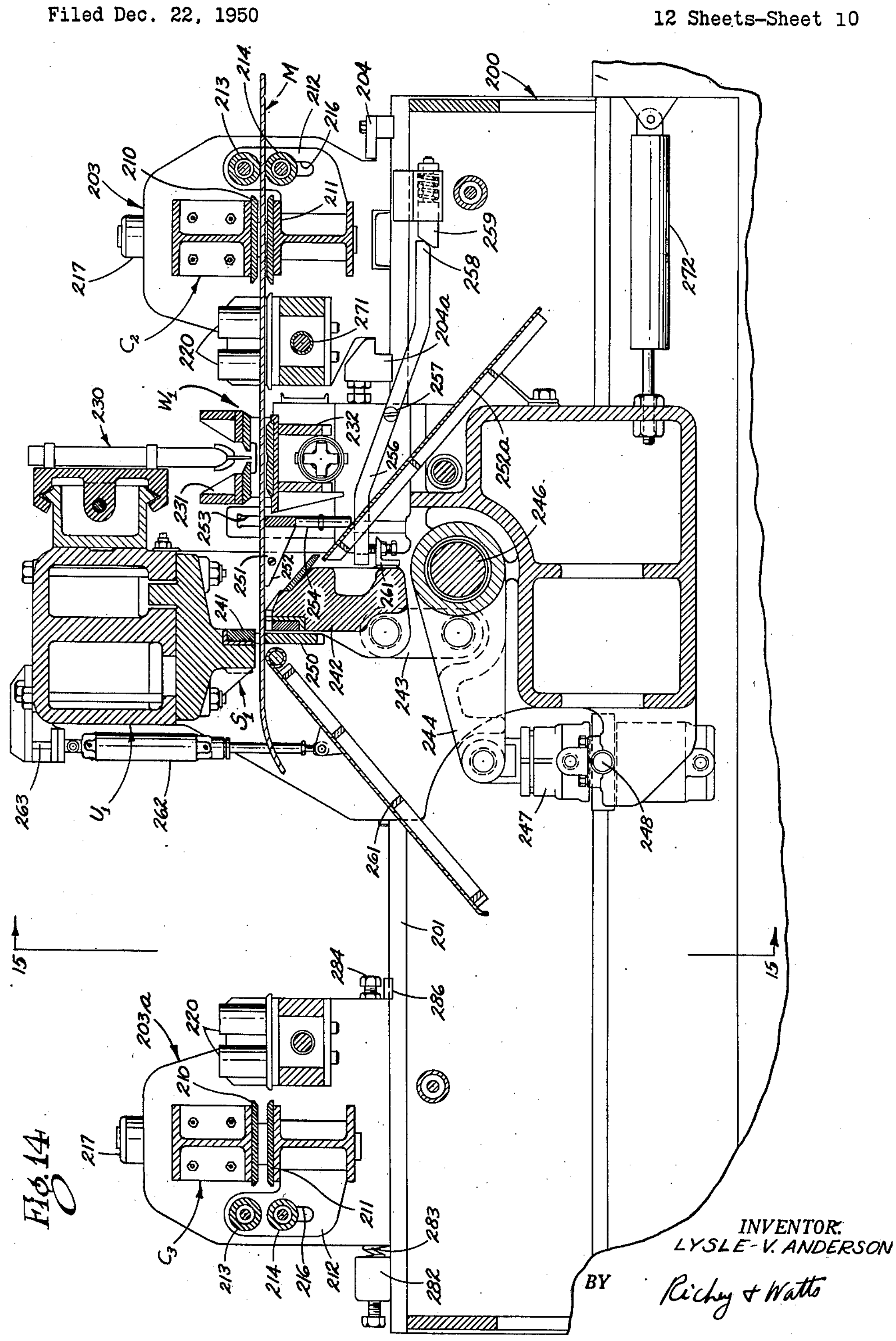
Fig. 14 is a longitudinal section of the modified form.
Figure 15:
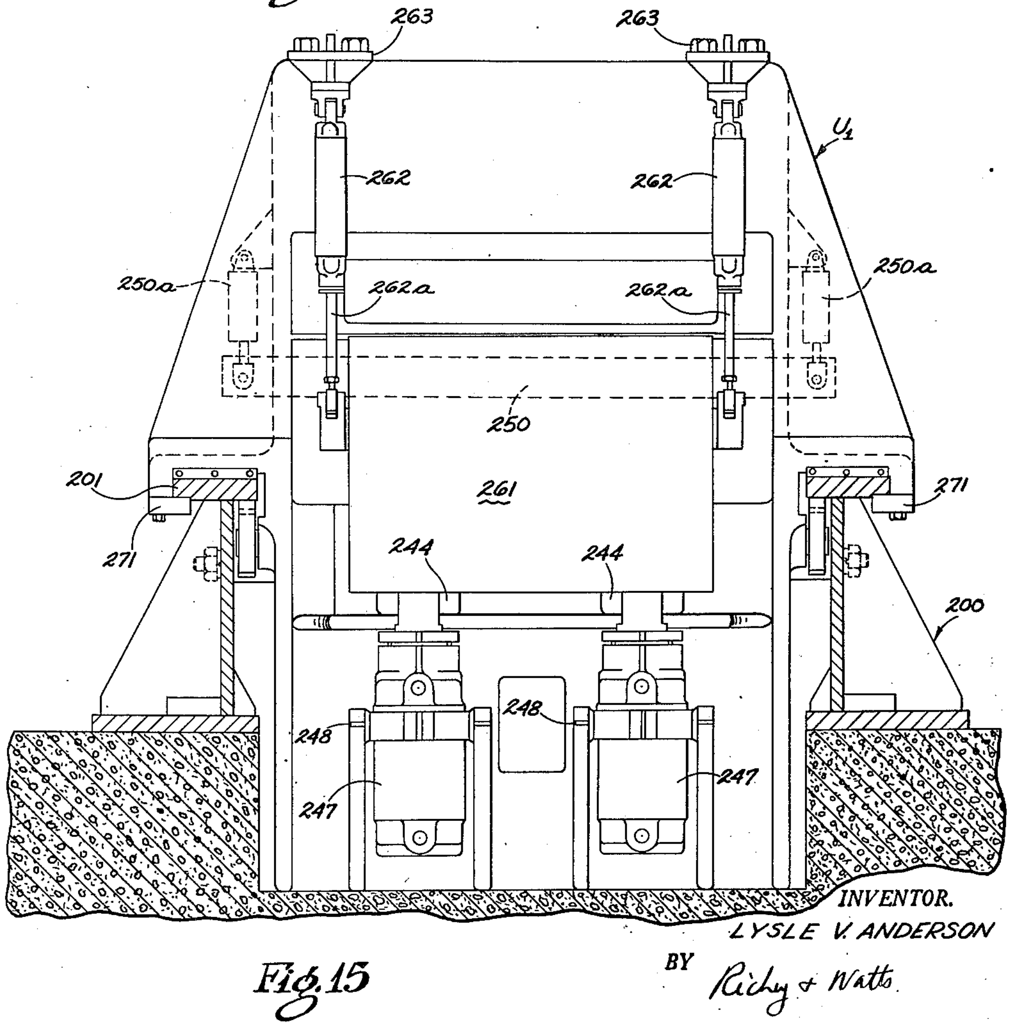
Fig. 15 is a section taken on 15—15 of Fig. 14.

A gig is likewise provided for holding the strip against the fixed shear blade during shearing, and in this embodiment of the invention takes the form of a transverse bar 250 (best seen in Figs. 14 and 15), which bar (as best seen in Fig. 15) may be raised and lowered by suitable piston and cylinder assemblies 250*a* mounted on the shear and welding unit and connected to the bar.

Means are provided for deflecting the tail end of the lead strip for single shearing of the leading end of the follow strip which has the general mode of operation of the deflecting means described in connection with the preferred embodiment of the invention, but which cannot be controlled independently of the shear for successive cropping of tails found on the lead strip. The aforesaid deflecting means comprises a triangular plate 251 having an upper surface parallel to the plane of the strip motion, and a lower inclined surface 252 which acts to deflect the leading edge of the follow strip downwardly so that the sheared end thereof will slide along a skid 252*a*

Deflector plates 251 are mounted for vertical motion in guide slots 253 formed in brackets at each side of the apparatus, and the plates are lifted by rods 254 extending downwardly therefrom. Part of the rod lifting apparatus comprises a lever 256 of the first class having one end underneath rods 254, being pivoted to the shear and welding unit as at 257, and having a cam end 258 formed for cooperation with a spring-pressed cam plunger 259 mounted on the bed of the apparatus. The bracket 261 is attached to the movable shear knife 242, and may carry an adjustment abutment screw.

The operation of the deflecting apparatus may be described as follows. As seen in Fig. 14, a strip M is in place preparatory to shearing the tail end thereof. When it is clamped for shearing, the shear knife is raised to sever the tail of the strip and, at the same time, member 261 (including the screws thereon) lift lever 256 which engages rods 254 and lifts plates 251 to hold the sheared strip above the plane of the fixed shear knife 241. Once lifted, cam end 258 of lever 256 rides downwardly over the plunger 259 and snaps under the plunger, holding the deflector and the strip in the aforesaid deflected position. The follow strip is now readily inserted beneath the shear knife with surface 252 on the deflector guiding it downwardly onto the platform 252*a*. If a double shear, that is shearing of both strips at once, is required, the deflector or its operating mechanism will be removed.

When the shear and welding unit is advanced to its welding position by means of cylinder assemblies, such as shown at 272, the end 258 of lever 256 is pulled clear of the plunger 259 and the deflector 251 falls to its lower position.

A combination tail end skid platform and entry platform 260 is pivotally mounted on the shear and welding unit, and is raised and lowered by cylinder assemblies 262 having piston rods 262*a* connected to the platform, the assemblies being mounted by suitable brackets 263 bolted to the shear and welding unit. The function of the aforesaid platform is like that of the platform described in connection with the preferred embodiment of the invention.

As described in my aforesaid copending application, means are provided for the automatic spacing of the sheared edges of the strip. To this end carriage 203*a* has guides 281 thereon mounting it for longitudinal motion along ways 201. Brackets 282 are fixed to the bed of the machine, and mounts springs 283 which urge the carriage to the right in the drawings. Adjustable abutment 284 is provided for engagement with a suitable portion of the shear and welding unit so that when the latter is moved to the shearing position (that is to the left in the drawings) the carriage 203*a* will be shifted to the left somewhat and so space the edges by an amount depending upon an adjustment of the abutment screws 284. Suitable stop means, shown at 286 in Fig. 14, limit the motion of the carriage in response to the force of springs 283.

The operation of this form of the apparatus should be understood in view of the rescription of the preferred embodiment, but will be briefly reviewed. All clamps are open and the lead strip M (as seen in Fig. 14) is advanced until the tail therein to be cropped is under the shear. Of course, the shear and welding unit will be in the shearing position. If desired, suitable adjustment of the exit side guide rollers may be made at this time. Strip clamp $C_2$ will then be closed, firmly holding the strip in its adjusted position which, as has been described, moves roller 213 upwardly to clear the upper clamp jaw 210. The shear is now actuated, cropping the tail from the strip, which slides down the skid 260, the latter being in its lowered position. Operation of the shear lifts the deflector 251 and the sheared end of the strip so that the latter is above the plane of the fixed shear knife 241. As has been described, the lever 256 and associated mechanism holds the deflector in its upper position.

The follow strip will now be threaded to the apparatus underneath the deflector 251 and toward the skid 252*a*. The entry side guides are suitably adjusted and the follow strip clamped by clamp assembly $C_3$. The platform 260 will have been lifted to its raised position by cylinder assembly 262 in order to assist in threading the follow strip between the shear blades. The shear is now operated to crop the lead end of the follow strip, the cropped end sliding down the platform 252*a*. If the sheared edges of the strips are offset, such offset may be compensated for by manipulation of hand wheel 208 which moves carriage 203 laterally of the apparatus.

Controls for the shear and welding unit motor are now operated to move the unit (to the left in the drawings) to its welding position. This releases the deflector 251 and the two strips may now assume a common plane. When the carriage approaches its welding position its strikes screws 284 and moves carriage 203*a* to the left, separating the sheared edges of the strips by the desired amount. Welding clamp $W_1$ is now closed, which firmly holds the sheared edges in their welding position. The welding operation is completed and all clamps opened, which brings the rollers 213 and 214 in engagement with the strip so that the welded strip may be passed through the apparatus until the end thereof again appears at the shear blades whereupon the aforesaid sequence of steps is repeated.

Having completed a detailed description of the present invention so that others skilled in the art may be able to understand and practice the same, I state that what I desire to secure by Letters Patent is defined in what is claimed.

What is claimed is:

1. In strip splicing apparatus having a frame, the combination of a strip shear with an upper fixed blade and a lower movable blade, a movable strip support adjacent said shear, said support having a horizontal upper surface and an inclined surface below said upper surface, said surfaces intersecting substantially adjacent to said blades, means responsive to the upward movement of said lower blade for moving said support from a lowered position to a raised position, holding means for holding said support in its raised position independently of said lower blade and said last named means, and means for releasing said support for return to its lowered position.

2. The apparatus according to claim 1 with a combined strip supporting platform and cropped end chute pivotally mounted at one end adjacent said shear on the side thereof opposite said support, said platform extending away from said shear, and means to raise said platform into the plane of strip travel to support an entering strip and to lower said platform to receive the cropped end of a leading strip being spliced.

3. The apparatus according to claim 1 with strip gripping means adjacent said movable strip support on the opposite side from said shear, said gripping means comprising a fixed upper jaw with a strip gripping face lying in a horizontal plane and a movable lower jaw, said movable strip support being connected to said movable jaw for movement therewith from a position below the plane of strip travel when said jaws are open to said lowered position when said jaws are closed, the connection of said movable strip support to said movable jaw permitting pivotal movement of said movable strip support upwardly relative to said movable jaw to said raised position.

4. In strip splicing apparatus having a frame, a strip shear and gripping unit having a strip shear and strip gripping means longitudinally spaced from said shear, said shear having an upper fixed blade with a lower end lying in a horizontal plane and a lower blade movable upwardly toward said upper blade and transversely of the strip for shearing same, said gripping means having an upper jaw with a strip gripping face lying in said horizontal plane and a lower jaw movable toward said upper jaw for gripping the strip therebetween, a vertically movable strip support on said unit between said shear and said gripping means, said support in response to movement of said lower blade being movable from a lower position below to an upper position above said horizontal plane, means for holding said support in said upper position independently of said lower blade, and means for releasing said support for return to its lower position.

5. The apparatus according to claim 4 in which said support is connected to and movable with said lower jaw of said gripping means.

6. Strip splicing apparatus having a shear, longitudinally spaced strip clamps on opposite sides of said shear, each of said clamps having one fixed and one movable jaw, a pair of vertically aligned strip guide rollers adjacent one of said clamps, one of said rollers being fixed and the other being movable toward and away from the fixed roller, said rollers being disposed to grip and hold a strip clear of the both adjacent clamp jaws with the jaws open and the rollers closed, said rollers being clear of the strip with the adjacent clamp jaws closed and the rollers open and means to drive one of said rollers to move strips longitudinally relative to said shear.

7. Strip splicing apparatus comprising a frame mounting, a pair of longitudinally spaced strip clamps, strip shear means between said clamps, each of said clamps having a fixed upper jaw and a movable lower jaw with said upper jaws lying in a common plane, said shear means having a movable lower blade and a fixed upper blade disposed in the plane of said fixed upper clamp jaws, a pair of vertically aligned strip guide rollers disposed outwardly of one of said clamps, the lower roller being fixed and the other being movable toward and away from the fixed roller, means to raise and lower the upper roller, said rollers being arranged when closed to grip and hold a strip clear of the clamp jaws of said one of said clamps with the jaws open, said upper roller being movable to a position with the periphery thereof above the lower surface of upper clamp jaw, said lower clamp jaw being arranged when closed to hold a strip against the upper jaw and clear of the fixed lower roller.

8. Strip splicing apparatus comprising a frame mounting a pair of longitudinally spaced strip clamps, strip shear means between said clamps, each of said clamps having one fixed and one movable jaw, a pair of vertically aligned strip guide rollers disposed outwardly of one of said clamps, one of said rollers being fixed and arranged to guide a strip clear of the movable jaw of said one of said clamps with the jaws open, means mounting the other of said rollers for motion toward and away from a strip passing between said rollers, and means connecting said other roller with said movable jaw to move said other roller away from the strip when the movable jaw is moved toward the fixed jaw to clamp the strip, said shear means comprising fixed and movable knife blades with the cutting end of the fixed blade disposed in the plane of said fixed clamp jaws.

9. Apparatus for shearing metal strips comprising a frame, a shearing unit reciprocable longitudinally relative to said frame between two limits for shearing strips fed longitudinally through the apparatus, and retractable strip support means on opposite sides of said unit for alternately supporting the length of strip between said unit and said limits, respectively, when said unit is positioned alternately at the respective limits comprising a platform carried by said unit on the strip entry side thereof, means for elevating and retracting said platform into and from the plane of strip travel, a roller support on the strip exit side of said unit, and means responsive to longitudinal movement of said unit for elevating and retracting said roller support into and out of the plane of strip travel.

10. Apparatus for shearing metal strips comprising a frame, a shearing unit reciprocable relative to said frame between two limits for shearing strips fed longitudinally through the apparatus, and retractable strip support means on the strip exit side of said unit for supporting said strip when said unit is moved from one of said limits to the other comprising a roller engageable with the underside of the strip, link means supporting said roller and pivotally connected to said unit and to said frame adjacent one of said limits of movement, said link means raising said roller into engagement with the strip when said unit is moved away from said one limit and retracting said roller from the strip when said unit is moved toward said one limit.

References Cited in the file of this patent

UNITED STATES PATENTS

| | | |
|---|---|---|
| 1,412,754 | Sevigne et al. | Apr. 11, 1922 |
| 1,737,204 | Spiess | Nov. 26, 1929 |
| 1,883,858 | Spiess | Oct. 18, 1932 |
| 1,925,915 | Allsworth | Sept. 5, 1933 |
| 2,078,365 | Biggert | Apr. 27, 1937 |
| 2,143,969 | Biggert | Jan. 17, 1939 |
| 2,196,600 | Wean | Apr. 9, 1940 |
| 2,214,478 | Rosenthal | Sept. 10, 1940 |
| 2,258,348 | Biggert | Oct. 7, 1941 |
| 2,268,242 | Candee | Dec. 30, 1941 |
| 2,363,577 | Dexter | Nov. 28, 1944 |
| 2,533,605 | Mueller | Dec. 12, 1950 |
| 2,549,560 | Archer | Apr. 17, 1951 |

FOREIGN PATENTS

| | | |
|---|---|---|
| 120,438 | Australia | Oct. 2, 1945 |